United States Patent
Call

(10) Patent No.: US 9,489,526 B1
(45) Date of Patent: Nov. 8, 2016

(54) PRE-ANALYZING SERVED CONTENT

(71) Applicant: Shape Security, Inc., Palo Alto, CA (US)

(72) Inventor: Justin D. Call, Santa Clara, CA (US)

(73) Assignee: Shape Security, Inc., Palo Alto, CA (US)

( * ) Notice: Subject to any disclaimer, the term of this patent is extended or adjusted under 35 U.S.C. 154(b) by 1 day.

(21) Appl. No.: 14/602,038

(22) Filed: Jan. 21, 2015

Related U.S. Application Data

(60) Provisional application No. 61/929,959, filed on Jan. 21, 2014.

(51) Int. Cl.
| | |
|---|---|
| *G06F 7/04* | (2006.01) |
| *G06F 17/30* | (2006.01) |
| *G06F 21/62* | (2013.01) |
| *G06Q 20/38* | (2012.01) |
| *G06F 21/55* | (2013.01) |
| *G06F 21/12* | (2013.01) |
| *G06F 21/14* | (2013.01) |

(52) U.S. Cl.
CPC ............. *G06F 21/62* (2013.01); *G06F 21/125* (2013.01); *G06F 21/128* (2013.01); *G06F 21/552* (2013.01); *G06Q 20/382* (2013.01); *G06F 21/14* (2013.01); *G06F 2221/033* (2013.01)

(58) Field of Classification Search
CPC .... G06F 21/12; G06F 21/125; G06F 21/128; G06F 21/14
See application file for complete search history.

(56) References Cited

U.S. PATENT DOCUMENTS

| | | |
|---|---|---|
| 6,938,170 B1 | 8/2005 | Kraft et al. |
| 7,480,385 B2 | 1/2009 | Weber |
| 7,640,583 B1 * | 12/2009 | Marinescu ............... G06F 21/55 713/187 |
| 7,707,223 B2 | 4/2010 | Zubenko et al. |
| 7,836,425 B2 | 11/2010 | Rubin et al. |
| 7,895,653 B2 | 2/2011 | Calo et al. |

(Continued)

FOREIGN PATENT DOCUMENTS

| | | |
|---|---|---|
| GB | 2443093 A | 4/2008 |
| WO | WO00/72119 | 11/2000 |

(Continued)

OTHER PUBLICATIONS

Currie, M., "In-the-wire authentication: Protecting client-side critical data fields in secure network transactions", 2009 2nd International Conference on Adaptive Science & Technology, 6 pages.

(Continued)

*Primary Examiner* — Daniel Potratz
(74) *Attorney, Agent, or Firm* — Fish & Richardson P.C.

(57) ABSTRACT

A computer-implemented method includes identifying first code for a content that has not been analyzed for purposes of transforming the first code before serving the code in response to future requests for the first code; analyzing the first code to identify portions of the first code that can be changed without affecting a manner in which the first code will function on client devices; subsequently receiving a request for the content; applying rules generated from analyzing the first code to a currently-served version of the first code, so as to obfuscated the currently-served version of the first code; and providing the obfuscated version of the currently-served version of the first code to a computing device that provide the request.

21 Claims, 4 Drawing Sheets

(56) References Cited

U.S. PATENT DOCUMENTS

| | | | |
|---|---|---|---|
| 8,020,193 B2 | 9/2011 | Bhola et al. | |
| 8,170,020 B2 | 5/2012 | Oliver et al. | |
| 8,200,958 B2 | 6/2012 | Coppola et al. | |
| 8,266,202 B1 | 9/2012 | Colton et al. | |
| 8,347,396 B2 | 1/2013 | Grigsby et al. | |
| 8,700,991 B1* | 4/2014 | Gigliotti | G06F 21/84 705/51 |
| 8,806,627 B1* | 8/2014 | Aharoni | G06F 21/14 726/22 |
| 8,904,279 B1 | 12/2014 | Bougon | |
| 9,241,004 B1 | 1/2016 | April | |
| 9,294,502 B1 | 3/2016 | Benishti | |
| 2002/0016918 A1* | 2/2002 | Tucker | G06F 21/14 713/190 |
| 2002/0099827 A1 | 7/2002 | Shah et al. | |
| 2004/0162994 A1 | 8/2004 | Cohen et al. | |
| 2007/0074227 A1 | 3/2007 | Naidu et al. | |
| 2008/0222736 A1* | 9/2008 | Boodaei | G06F 21/128 726/27 |
| 2009/0144829 A1 | 6/2009 | Grigsby et al. | |
| 2009/0193513 A1 | 7/2009 | Agarwal et al. | |
| 2009/0249310 A1 | 10/2009 | Meijer et al. | |
| 2009/0282062 A1 | 11/2009 | Husic | |
| 2009/0300774 A1* | 12/2009 | Makkinejad | G06F 21/629 726/27 |
| 2010/0100927 A1 | 4/2010 | Bhola et al. | |
| 2010/0180346 A1* | 7/2010 | Nicolson | G06F 21/14 726/26 |
| 2010/0257354 A1 | 10/2010 | Johnston et al. | |
| 2010/0262780 A1 | 10/2010 | Mahan et al. | |
| 2011/0015917 A1 | 1/2011 | Wang et al. | |
| 2011/0022846 A1 | 1/2011 | Ginter et al. | |
| 2011/0107077 A1 | 5/2011 | Henderson et al. | |
| 2011/0178973 A1 | 7/2011 | Lopez et al. | |
| 2011/0296391 A1 | 12/2011 | Gass et al. | |
| 2012/0022942 A1 | 1/2012 | Holloway et al. | |
| 2012/0096116 A1 | 4/2012 | Mislove et al. | |
| 2012/0124372 A1 | 5/2012 | Dilley et al. | |
| 2012/0198528 A1 | 8/2012 | Baumhof | |
| 2012/0254845 A1* | 10/2012 | Yi | G06F 8/45 717/144 |
| 2013/0091582 A1 | 4/2013 | Chen et al. | |
| 2013/0198607 A1 | 8/2013 | Mischook et al. | |
| 2013/0232234 A1 | 9/2013 | Kapur et al. | |
| 2013/0232578 A1 | 9/2013 | Chevallier-Mames et al. | |
| 2014/0089786 A1 | 3/2014 | Hashmi | |
| 2014/0281535 A1 | 9/2014 | Kane et al. | |

FOREIGN PATENT DOCUMENTS

| | | |
|---|---|---|
| WO | WO02/093369 | 11/2002 |
| WO | WO2010/046314 | 4/2010 |
| WO | WO 2013/091709 | 6/2012 |

OTHER PUBLICATIONS

Li et al., "WebShield: Enabling various web defense techniques without client side modifications," In Proceedings of the 18th Annual Network and Distributed System Security Symposium (NDSS), 2011, 18 pages.

Matsunaka et al., "Detecting and Preventing Drive-By Download Attack via Participative Monitoring of the Web," in Information Security (Asia JCIS), 2013 Eighth Asia Joint Conference on Information Security, pp. 48-55. doi: 10.1109/ASIAJCIS.2013.15.

Sedaghat et al., "On-the-fly web content integrity check boosts users' confidence"; Nov. 2002; Communications of the ACM, vol. 45 Issue 11; Publisher: ACM; pp. 33-37.

\* cited by examiner

PRE-ANALYZING SERVED CONTENT

CROSS-REFERENCE TO RELATED APPLICATIONS

This application claims priority under 35 U.S.C. §119(e)(1), to U.S. Provisional Application Ser. No. 61/929,959, filed on Jan. 21, 2014, the entire contents of which are incorporated herein by reference.

TECHNICAL FIELD

This document generally relates to computer communications.

BACKGROUND

Commercial and government information providers serve a wide variety of web resources to requesting client devices. For example, banks and retailers operate sophisticated web sites and serve mark-up code and associated CSS code and JavaScript code from their web server systems to potential customers. Such web sites may seek private information from users and carry out monetary transactions, such as by obtaining information about credit card of banking accounts for the transfer of money. Illicit organizations attempt to interfere with such transactions, such as to obtain access to monetary accounts of users or to have goods surreptitiously delivered by associates of the illicit organizations.

For example, it is common for illicit organizations to cause malware to be installed on numerous client computers without the knowledge of the owners and operators of those computers. As one example, known as a "man in the middle" attack, that malware may present itself to a user as if it is legitimate software from a bank, retailer, or other provider, and may then cause the user to pass it private information (e.g., social security number and credit card number), and may then pass different information to the relevant information provider (e.g., having money transferred from the user's account to another account, while showing the user transaction information that looks legitimate).

SUMMARY

This document describes systems and techniques by which various user computing devices (computers such as desktops, laptops, tablets, and smartphones) can be provided with "polymorphic" code, in that the code is changed between different servings of the code in manners separate from changes that a user can see, so as to block illicit attempts to interact with the code while still maintaining the user experience of the original code. For example, names of certain functions can be changed consistently across mark-up code, CSS code, and JavaScript code (among others) so that the names are different than those provided by a programmer of the code, to names that are essentially random (but consistent across the code) from one serving to another. Such re-coding may provide for both malware deflection and malware detection. Malware deflection may be achieved because the constant re-coding creates a moving target that the malware has to hit in order to be successful, and if done properly, not even sophisticated malware will be able to keep up. Malware detection may occur by providing instrumentation code to the client devices that can identify the signs of malware on a machine, such as efforts by third-party code to interact with the served code by using an "old" name that provides a "tell" for the malware.

Such creation of polymorphic re-coded code involves analysis of the original code, e.g., to determine static elements that can be altered without affecting the presentation or function of the relevant resources. The analysis may be used to create a map for making the changes, and then each time the code is to be served, the map can be used to locate in the resources (e.g., the code) the elements that are to be changed, and the manner of the changes, so that the change may be applied (e.g., generating and/or selecting a random name and swapping that for an original name in the code). The analysis may be performed once for each of many servings and re-codings of the resource—e.g., an initial analysis, and then limited re-analysis each time a substantive change is made to the original code.

In general, the analysis of original code to determine which elements are susceptible to polymorphic treatment is much more computationally expensive than is the application of maps or rules to create the polymorphism once the analysis has been performed. The former may require extensive analysis of syntax in the code and of complex interrelationships between elements of the code (e.g., functions calls that go in all sorts of directions based on all sorts of if-then predicates). The latter may simply involve traversing the code using a map, and substituting alphanumeric text for original text at particular positions, but all in a relatively determinate manner. Moreover, the analysis may be best performed using manual operator assistance.

As such, described in particular below are systems and techniques for analyzing web content before it is requested by a user trying to access a website. The content may be identified by a web crawler that is aimed at one or more predetermined domains, such as the domains of companies that are customers of a malware avoidance and detection system. The spider may identify the existence of new content or the recent alteration of existing content. The spider may then identify all documents that to which the new or altered document is directed, either directly or indirectly, and may gather copies of such documents. For changes in content, the system may then determine whether the changes affect a prior analysis in any manner, e.g., interfere with any elements in the code that were previously identified as being subject to polymorphic treatment.

For new content, or when changes in content are determined to interfere with prior analysis, the system may trigger the execution of additional analysis, which may be manual, automatic, or both. For manual analysis, the system may determine whether a human operator is available to perform the analysis, and may place an entry in a queue for that operator. The operator may then work through the queue in performing manual analysis. Certain automatic analysis may be performed before the operator is provided access to analyze the code, such as by a system identifying all instances of a particular code element and marking those instances of a common element in a common visual manner, such as by highlighting in a particular color a function name that appears multiple times across a code base for a web page. For fully automatic analysis, the spider may notify an automatic system, which may then traverse the code base to identify elements susceptible to polymorphic treatment (e.g., by identifying certain predetermined tags and then identifying parameters associated with the tags by parsing the code documents according to a known programming syntax).

Mappings and rules for transformation of the code may be created from the analysis, and may later be used when an end user (e.g., employing a web browser or other application for interacting with content) requests content for the web page, at run-time. The mappings and rules may be applied to code retrieved from the web server at run-time (because the code may be custom for the particular requester), and the mappings and rules may be applied to it to generate polymorphic elements from it, according to the analysis. An initial run-time analysis may also be performed to make sure the code has not changed since the prior analysis, such as by generating a document object model, and comparing that to a document object model that was generated form the code on which the most recent analysis was performed. If the comparison shows that a material change has been made to the code, additional analysis may need to be performed at run-time, though all of the run-time analysis might be capable of being performed fully automatically, such as when the changes are small (e.g., adding or removing instances of a function name that was already identified by the prior analysis).

Various implementations are described herein using hardware, software, firmware, or a combination of such components. In one implementation, a computer-implemented method comprises identifying first code for a content that has not been analyzed for purposes of transforming the first code before serving the code in response to future requests for the first code; analyzing the first code to identify portions of the first code that can be changed without affecting a manner in which the first code will function on client devices; subsequently receiving a request for the content; applying rules generated from analyzing the first code to a currently-served version of the first code, so as to obfuscated the currently-served version of the first code; and providing the obfuscated version of the currently-served version of the first code to a computing device that provide the request.

The features discussed here may, in certain implementations, provide one or more advantages. For example, a security intermediary system may be provided that does not add an appreciable level of bandwidth to the communication channel between a server system and the clients it services. The intermediary system may change code from a web server system in a way that prevents interference with the code by malware (e.g., by introducing polymorphic elements that are changed with every serving or every n servings of the code). The relatively computationally-intensive analysis may be performed in advance, when time is not a premium, and the faster polymorphic application of the analysis results to the analyzed content may be performed at run-time, when latency is a larger concern.

Other features and advantages will be apparent from the description and drawings, and from the claims.

BRIEF DESCRIPTION OF THE DRAWINGS

Like reference numbers and designations in the various drawings indicate like elements.

DETAILED DESCRIPTION

This document discusses mechanisms for analyzing and modifying code so as to obfuscate from potential malware the hidden structure of the code, so that the malware cannot exploit the code, and to do so in a manner that serves the code polymorphically. Such polymorphism is achieved by serving code that changes frequently (e.g., each time it is served or each n times it is served) so as to create a moving target for malware that would otherwise determine the structure of, and exploit the code. To be able to create such frequent changes, or polymorphism, in the code, original code that would otherwise be served by a web server system is analyzed, and opportunities for changing the code polymorphically are identified and tracked. Such opportunities may include code elements whose values do not affect the function of the served code (e.g., do not noticeably change what is displayed to a user of a web browser). The locations of a particular element (e.g., the name of a function that is called many times in the code) may thus be determined and flagged by the analysis.

Such analysis may be performed without the presence of an outstanding request for the content—e.g., from someone who has directed their browser to a domain that corresponds to the serving of the content. The triggering for the analysis may thus be something other than a request for the content to be analyzed, such as a web spider programmed to crawl various domains, such as a whitelist of seed domains for a particular organization or domains for all organizations that subscribe to a web security system provided by a third party. Alternatively, web pages may be checked periodically or a web server system may be provided with code that causes a security system to be affirmatively notified whenever code is changed. The analysis may then be performed (perhaps after verifying whether any changes to previously-analyzed code have a material affect on the previous analysis) so as to identify elements in the code to be affected polymorphically (e.g., because their particular values do not affect the way the code operates on a browser) and to generate a map of such elements in the code and rules for modifying those elements.

At run-time when a request for the web page is made by an end user, the map and rules may be consulted so that the polymorphing values of those elements can be assigned quickly, with relatively little processing power or added latency, and may be served to the requesting end user in a manner that all of the polymorphic changes have been made consistently across each file and across different files (e.g., HTML and corresponding CSS and JavaScript), and the code does not break when it is rendered and interacted with.

Figure 1:
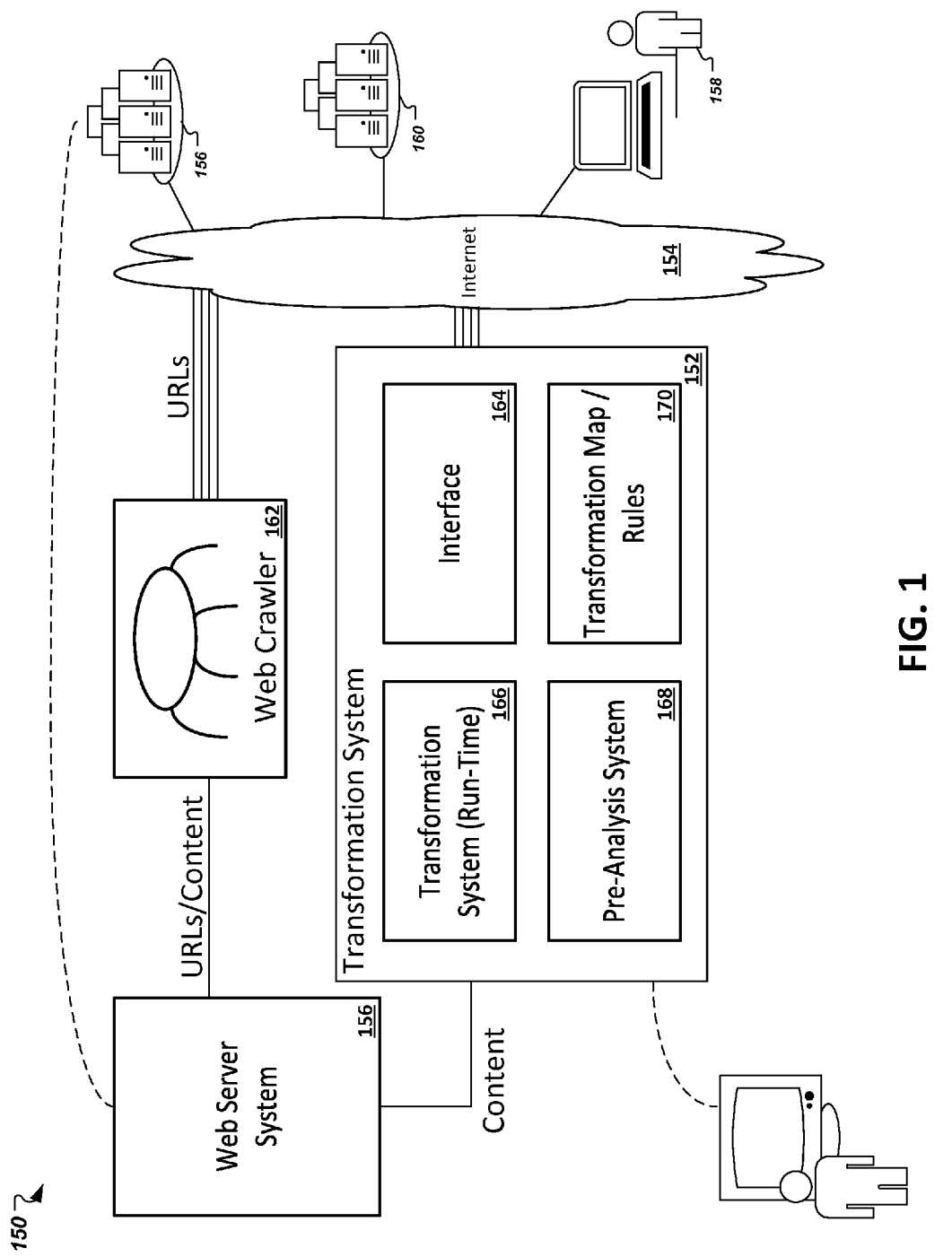
FIG. 1 is a conceptual diagram of a system for analyzing content for transformation before the content is requested.

FIG. 1 is a conceptual diagram of a system 150 for analyzing content for transformation before the content is requested. In general, the system 150 include mechanisms for identifying code that may be served to users in the future and it may need analysis for being served in a polymorphic manner to such users in the future. The system may use such mechanisms so that it is able to perform the analysis in advance of the code being required by a user, so that polymorphic transformation of the code may occur with fewer computing resources and less latency at the time the code is requested.

As shown in the figure, a transformation system 152 interacts with an end user 158 through the Internet 154. The user 158 may interact by way of various computers, such as a smart phone, a tablet, a laptop, or a desktop computer. The transformation system 152 may intercept requests made by the end-user 158 and intended for a Web server system 156. The Web server system 156 may be operated by the same organization that operates the transformation system 152 or by a customer of the transformation system operator. The Web server system 156, in typical embodiments, may serve content of a type that malicious parties would like to interact with. For example, the Web server system 156 may operate an online retail store that malicious parties would like to elicit we order goods from using another users credit card information, and online that elicit parties would like to access in order to transfer funds to their own accounts, or a government site that elicit parties may wish to exploit.

Web server system 156 is shown in two locations in this example to indicate that mutations between Web server system 156 and transformation system 152 may be by way of an internal network, or by way of the Internet 154. Typically, where high volume transactions need to occur between the systems, the connection would be through a private local network. The transformation system 152 may take requests from the end-user 158 and submit them, either in their original form or in a trance warmed manner, to the Web server system 156 the Web server system 156 may then respond by serving content intended to reach the end-user 158. The transformation system 152 may be responsible for altering that content in a polymorphic manner such as by changing certain strings in the content consistently across the content into corresponding random strings. In referring to random changes here, it is meant that the changes are sufficiently unpredictable that software from an elicit organization would have an almost negligible likelihood of predicting what the changes would be in any given serving of the code.

As is relevant here, the transformation system 152 is augmented by a Web crawler 162 which may be a separate subsystem or may be part of the transformation system 152 itself. The Web crawler 162 may take a familiar form, and may operate to identify content that has changed or newly appeared at particular domains, and to gather that content and other content that is addressed by that content. In particular, the Web crawler 162 may be programmed with C. URLs of particular websites and may check for changed or new content at the particular seed URLs and that all URLs or other resources that are referenced from the C. URLs either indirectly or directly. The particular content accessed by the Web crawler 162 may include all content that may be needed for interaction with the seed URLs, such as JavaScript and CSS related to a particular website.

The Web crawler 162 may operate continuously or periodically to traverse a list of domains to be crawled, where the list may be all domains or particular base webpages for a company that operates the Web crawler, or domains for all customers or subscribers to a company that sells security hardware and services. The frequency with which particular sites are crawled may be controlled so as to be frequent enough to identify new or changed code before it is served, but not so frequent as to provide an unnecessary load on the corresponding Web servers. The frequency may vary for different URLs, such as by the system identifying that certain URLs are changed much more frequently than others, so that the Web crawler 162 crawls the former URLs much more frequently than the latter.

If the Web crawler 162 does not identify any new code or changing code for a particular base URL, it may continue crawling at another location. If the Web crawler 162 does identify changes, it may notify the transformation system 152 so as to cause the transformation system 152 to begin an analysis process on the identified code. In such a situation, the Web crawler 162 may also gather code for the changed page and other code that is expected to be needed to render the changed page, such as CSS and JavaScript that is called from the page, and other code called from that CSS and JavaScript. The Web crawler 162 may also do certain preliminary analysis or processing of the code, such as by indexing the code and generating document object models (DOMS) for the webpage or pages.

Upon being notified that there is content in need of potential analysis, such as by being new or changed content, the transformation system 152 may provide information about the content to a pre-analysis system 168. As an initial step, the pre-analysis system 168 may, in the case of code that has been previously analyzed but subsequently changed, make a determination whether the changes are material in any manner to the prior analysis. In particular, the determination may identify whether the changes affect any elements in the code that were identified for polymorphic treatment in the earlier analysis. If no such elements are affected by the change, subsequent analysis may be unnecessary, and the transformation system 152 may terminate any subsequent analysis. If the determination of material that he is positive, the pre-analysis system 168 may perform additional analysis on the changed or new code. Such additional analysis may be manual, automatic, or a combination of the two.

For automatic analysis, the system 152 may parse the code to identify predetermined elements, patterns or other information in the code for purposes of assisting in the analysis of the code or completely performing such analysis. For example, the pre-analysis system 168 may perform an initial review of the code to identify all elements that could potentially be subject to polymorphic treatment. In one example, all function and variable names may be identified in all instances of the identified function and variable names may also be identified across the code base for a page. Such names are frequently susceptible to polymorphic treatment as long as the names are changed consistently across the code base, because the names are generally not shown to a user of a Web browser that renders the code.

Such a sick analysis may then be provided to a human user and a terminal 167 who may visually analyze the code and employ other tools for performing more sophisticated analysis on the code so as to determine which elements actually are susceptible to polymorphic treatment. For example, each of the instances for a particular element, such as a particular function name, may be highlighted in a certain common color across the code base on a display of the terminal 167. Other elements may be highlighted in respective different colors. Tools may also be provided to allow the operator to easily jump between and view each instance of a particular element. In this manner, the operator may quickly look at the code around each element to determine whether making the element one that is treated polymorphically is something that will affect the functionality of the code or not.

Subsequent automatic analysis and processing may be performed once the operator has identified element for polymorphic treatment and identified how they are to be treated, such as by identifying that certain names should be changed into random strings having a particular length, with different random strings being assigned for each serving of the code. The manual and automatic analysis may also be performed recursively, with the operator identifying potential changes, a system implementing those changes, and the operator confirming whether the implemented changes are sufficient to provide adequate obfuscation from malware operating on client devices.

One example of a tool for allowing an operator to determine whether identified operations for creating polymorphic code will be sufficient, is to generate representations of a webpage with and without the modifications dictated by the operator or dictated automatically by other portions of the system. If those representations essentially or fully match, then the modifications can be deemed adequate because they do not affect user interaction with the webpage. If they do not match then they might be deemed inadequate and other modifications may need to be made by the system 168. Examples of the comparisons include comparing document object models for both versions of the page and comparing raster images for both versions of the page. For example, an image comparison application may be used to find differences between pixels into different representations of a page and to either automatically analyze those differences or to highlight the differences so that a human operator may manually analyze them and determine whether they are material or not.

The analysis may result in the creation of a transformation map and/or rules for subsequently transforming the content from Web server system 156 when it is subsequently requested by end-user 158. The transformation map may identify locations in the content at which changes are to be made, whereas the transformation rules may identify the nature of the changes to be made in each such location. The map and or rules may be represented in a variety of common manners, such as by being defined in an extended mark-up language (XML) file or files. Other appropriate representations may also be employed.

An interface 164 manages interaction with devices of end-users such as end-user 158, and with other Web server systems such as server 160. Access may be needed to external Web server systems such as server 160 when the code base that is to be analyzed includes code that points to ask server systems such as server 160. For example, an HTML file served by Web server system 156 may make a call to a JavaScript file served by a third-party in such a situation, it may be necessary to know the code of the JavaScript file in order to make modifications for use in providing polymorphic code.

The interface 164 also interacts with a transformation system run time 166, which is programmed to implement the transformation map and rules 170 generated from the analysis process. For example, if the end-user 158 requests a webpage from Web server system 156, the interface 164 may pass that request on to the Web server system 156, which may then supply the requested code. The transformation system 166 may intercept the code provided by the Web server system 156 and may read that code by applying the transformation map and rules 170. For example, the transformation system run time 166 may use the map to identify elements in the served code that are subject to polymorphic modification, and may then use a corresponding rule to determine how the polymorphic modification is to occur. The transformation system run time 166 may then apply the appropriate transformation rules to the corresponding identified portion of the content. The transformation system run time 166 may also provide the same rules to other instances of the same element or other portions of the content so that the changes are made consistently across the code base that is served to the end-user 158.

In this manner then, a system 150 is provided that may identify code that may need to be analyzed because it has not yet been fully analyzed and will be requested or maybe requested by a user in the future, and may perform data analysis a relatively leisurely pace that does not interfere or create latency with a user request for the code. The analysis may be used when it is still fresh and may be replaced as appropriate when it has become stale, so that a user may receive the requested content quickly and the requested content may also be up-to-date and the polymorphisms may be applied to the requested content in a manner that matches the current version of the content and does not break the code when it is rendered for the user.

Figure 2:
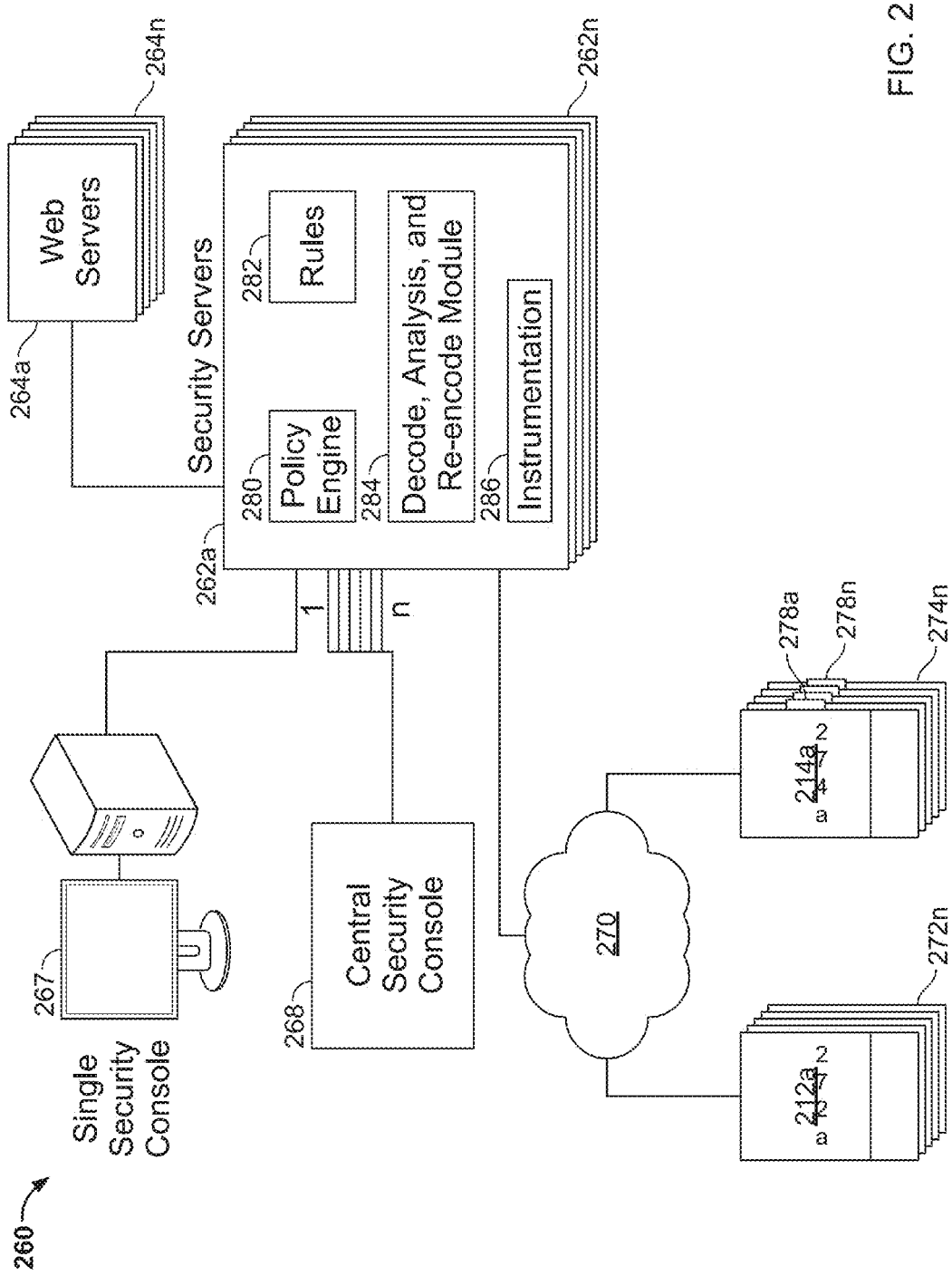
FIG. 2 shows a system for serving polymorphic and instrumented code.

FIG. 2 shows a system 260 for serving polymorphic and instrumented code. The system 260 may be adapted to perform deflection and detection of malicious activity with respect to a web server system. The system 260 in this example is a system that is operated by or for a large number of different businesses that serve web pages and other content over the internet, such as banks and retailers that have on-line presences (e.g., on-line stores, or on-line account management tools). The main server systems operated by those organizations or their agents are designated as web servers 264a-264n, and could include a broad array of web servers, content servers, database servers, financial servers, load balancers, and other necessary components (either as physical or virtual servers).

A set of security server systems 262a to 262n are shown connected between the web servers 264a to 264n and a network 270 such as the internet. Although both extend to n in number, the actual number of sub-systems could vary. For example, certain of the customers could install two separate security server systems to serve all of their web server systems (which could be one or more), such as for redundancy purposes. The particular security server systems 262a-262n may be matched to particular ones of the web server systems 264a-264n, or they may be at separate sites, and all of the web servers for various different customers may be provided with services by a single common set of security servers 262a-262n (e.g., when all of the server systems are at a single co-location facility so that bandwidth issues are minimized).

Each of the security server systems 262a-262n may be arranged and programmed to carry out operations like those discussed above and below and other operations. For example, a policy engine 280 in each such security server system may evaluate HTTP requests from client computers (e.g., desktop, laptop, tablet, and smartphone computers) based on header and network information, and can set and store session information related to a relevant policy. The policy engine may be programmed to classify requests and correlate them to particular actions to be taken to code returned by the web server systems before such code is served back to a client computer. When such code returns, the policy information may be provided to a decode, analysis, and re-encode module, which matches the content to be delivered, across multiple content types (e.g., HTML, JavaScript, and CSS), to actions to be taken on the content (e.g., using XPATH within a DOM), such as substitutions, addition of content, and other actions that may be provided as extensions to the system. For example, the different types of content may be analyzed to determine naming that may extend across such different pieces of content (e.g., the name of a function or parameter), and such names may be changed in a way that differs each time the content is served, e.g., by replacing a named item with randomly-generated characters. Elements within the different types of content may also first be grouped as having a common effect on the operation of the code (e.g., if one element makes a call to another), and then may be re-encoded together in a common manner so that their interoperation with each other will be consistent even after the re-encoding.

Both the analysis of content for determining which transformations to apply to the content, and the transformation of the content itself, may occur at the same time (after receiving a request for the content) or at different times. For example, the analysis may be triggered, not by a request for the content, but by a separate determination that the content newly exists or has been changed. Such a determination may be via a "push" from the web server system reporting that it has implemented new or updated content. The determination may also be a "pull" from the security servers 262*a*-262*n*, such as by the security servers 262*a*-262*n* implementing a web crawler (not shown) like web crawler 162 in FIG. 1 to recursively search for new and changed content and to report such occurrences to the security servers 262*a*-262*n*, and perhaps return the content itself and perhaps perform some processing on the content (e.g., indexing it or otherwise identifying common terms throughout the content, creating DOMs for it, etc.). The analysis to identify portions of the content that should be subjected to polymorphic modifications each time the content is served may then be performed according to the manner discussed above and below.

A rules engine 282 may store analytical rules for performing such analysis and for re-encoding of the content. The rules engine 282 may be populated with rules developed through operator observation of particular content types, such as by operators of a system studying typical web pages that call JavaScript content and recognizing that a particular method is frequently used in a particular manner. Such observation may result in the rules engine 282 being programmed to identify the method and calls to the method so that they can all be grouped and re-encoded in a consistent and coordinated manner.

The decode, analysis, and re-encode module 284 encodes content being passed to client computers from a web server according to relevant policies and rules. The module 284 also reverse encodes requests from the client computers to the relevant web server or servers. For example, a web page may be served with a particular parameter, and may refer to JavaScript that references that same parameter. The decode, analysis, and re-encode module 284 may replace the name of that parameter, in each of the different types of content, with a randomly generated name, and each time the web page is served (or at least in varying sessions), the generated name may be different. When the name of the parameter is passed back to the web server, it may be re-encoded back to its original name so that this portion of the security process may occur seamlessly for the web server.

A key for the function that encodes and decodes such strings can be maintained by the security server system 262 along with an identifier for the particular client computer so that the system 262 may know which key or function to apply, and may otherwise maintain a state for the client computer and its session. A stateless approach may also be employed, whereby the system 262 encrypts the state and stores it in a cookie that is saved at the relevant client computer. The client computer may then pass that cookie data back when it passes the information that needs to be decoded back to its original status. With the cookie data, the system 262 may use a private key to decrypt the state information and use that state information in real-time to decode the information from the client computer. Such a stateless implementation may create benefits such as less management overhead for the server system 262 (e.g., for tracking state, for storing state, and for performing clean-up of stored state information as sessions time out or otherwise end) and as a result, higher overall throughput.

The decode, analysis, and re-encode module 284 and the security server system 262 may be configured to modify web code differently each time it is served in a manner that is generally imperceptible to a user who interacts with such web code. For example, multiple different client computers may request a common web resource such as a web page or web application that a web server provides in response to the multiple requests in substantially the same manner. Thus, a common web page may be requested from a web server, and the web server may respond by serving the same or substantially identical HTML, CSS, JavaScript, images, and other web code or files to each of the clients in satisfaction of the requests. In some instances, particular portions of requested web resources may be common among multiple requests, while other portions may be client or session specific. The decode, analysis, and re-encode module 284 may be adapted to apply different modifications to each instance of a common web resource, or common portion of a web resource, such that the web code that it is ultimately delivered to the client computers in response to each request for the common web resource includes different modifications.

Even where different modifications are applied in responding to multiple requests for a common web resource, the security server system 262 can apply the modifications in a manner that does not substantially affect a way that the user interacts with the resource, regardless of the different transformations applied. For example, when two different client computers request a common web page, the security server system 262 applies different modifications to the web code corresponding to the web page in response to each request for the web page, but the modifications do not substantially affect a presentation of the web page between the two different client computers. The modifications can therefore be made largely transparent to users interacting with a common web resource so that the modifications do not cause a substantial difference in the way the resource is displayed or the way the user interacts with the resource on different client devices or in different sessions in which the resource is requested.

An instrumentation module 286 is programmed to add instrumentation code to the content that is served from a web server. The instrumentation code is code that is programmed to monitor the operation of other code that is served. For example, the instrumentation code may be programmed to identify when certain methods are called, when those methods have been identified as likely to be called by malicious software. When such actions are observed to occur by the instrumentation code, the instrumentation code may be programmed to send a communication to the security server reporting on the type of action that occurred and other meta data that is helpful in characterizing the activity. Such information can be used to help determine whether the action was malicious or benign.

The instrumentation code may also analyze the DOM on a client computer in predetermined manners that are likely to identify the presence of and operation of malicious software, and to report to the security servers 262 or a related system. For example, the instrumentation code may be programmed to characterize a portion of the DOM when a user takes a particular action, such as clicking on a particular on-page button, so as to identify a change in the DOM before and after the click (where the click is expected to cause a particular change to the DOM if there is benign code operating with respect to the click, as opposed to malicious code operating with respect to the click). Data that characterizes the DOM may also be hashed, either at the client computer or the server system 262, to produce a representation of the DOM (e.g., in the differences between part of the DOM before and after a defined action occurs) that is easy to compare against corresponding representations of DOMs from other client computers. Other techniques may also be used by the instrumentation code to generate a compact representation of the DOM or other structure expected to be affected by malicious code in an identifiable manner.

As noted, the content from web servers 264a-264n, as encoded by decode, analysis, and re-encode module 284, may be rendered on web browsers of various client computers. Uninfected client computers 272a-272n represent computers that do not have malicious code programmed to interfere with a particular site a user visits or to otherwise perform malicious activity. Infected client computers 274a-274n represent computers that do have malware or malicious code (278a-278n, respectively) programmed to interfere with a particular site a user visits or to otherwise perform malicious activity. In certain implementations, the client computers 272, 274 may also store the encrypted cookies discussed above and pass such cookies back through the network 210. The client computers 212, 214 will, once they obtain the served content, implement DOMs for managing the displayed web pages, and instrumentation code may monitor the respective DOMs as discussed above. Reports of illogical activity (e.g., software on the client device calling a method that does not exist in the downloaded and rendered content) can then be reported back to the server system.

The reports from the instrumentation code may be analyzed and processed in various manners in order to determine how to respond to particular abnormal events, and to track down malicious code via analysis of multiple different similar interactions across different client computers 272, 274. For small-scale analysis, each web site operator may be provided with a single security console 267 that provides analytical tools for a single site or group of sites. For example, the console 267 may include software for showing groups of abnormal activities, or reports that indicate the type of code served by the web site that generates the most abnormal activity. For example, a security officer for a bank may determine that defensive actions are needed if most of the reported abnormal activity for its web site relates to content elements corresponding to money transfer operations—an indication that stale malicious code may be trying to access such elements surreptitiously.

Console 267 may also be multiple different consoles used by different employees of an operator of the system 260, and may be used for pre-analysis of web content before it is served, as part of determining how best to apply polymorphic transformations to the web code. For example, in combined manual and automatic analysis like that described above, an operator at console 267 may form or apply rules 282 that guide the transformation that is to be performed on the content when it is ultimately served. The rules may be written explicitly by the operator or may be provided by automatic analysis and approved by the operator. Alternatively, or in addition, the operator may perform actions in a graphical user interface (e.g., by selecting particular elements from the code by highlighting them with a pointer, and then selecting an operation from a menu of operations) and rules may be written consistent with those actions.

A central security console 268 may connect to a large number of web content providers, and may be run, for example, by an organization that provides the software for operating the security server systems 262a-262n. Such console 268 may access complex analytical and data analysis tools, such as tools that identify clustering of abnormal activities across thousands of client computers and sessions, so that an operator of the console 268 can focus on those clusters in order to diagnose them as malicious or benign, and then take steps to thwart any malicious activity.

In certain other implementations, the console 268 may have access to software for analyzing telemetry data received from a very large number of client computers that execute instrumentation code provided by the system 260. Such data may result from forms being re-written across a large number of web pages and web sites to include content that collects system information such as browser version, installed plug-ins, screen resolution, window size and position, operating system, network information, and the like. In addition, user interaction with served content may be characterized by such code, such as the speed with which a user interacts with a page, the path of a pointer over the page, and the like.

Such collected telemetry data, across many thousands of sessions and client devices, may be used by the console 268 to identify what is "natural" interaction with a particular page that is likely the result of legitimate human actions, and what is "unnatural" interaction that is likely the result of a bot interacting with the content. Statistical and machine learning methods may be used to identify patterns in such telemetry data, and to resolve bot candidates to particular client computers. Such client computers may then be handled in special manners by the system 260, may be blocked from interaction, or may have their operators notified that their computer is potentially running malicious software (e.g., by sending an e-mail to an account holder of a computer so that the malicious software cannot intercept it easily).

Figure 3:
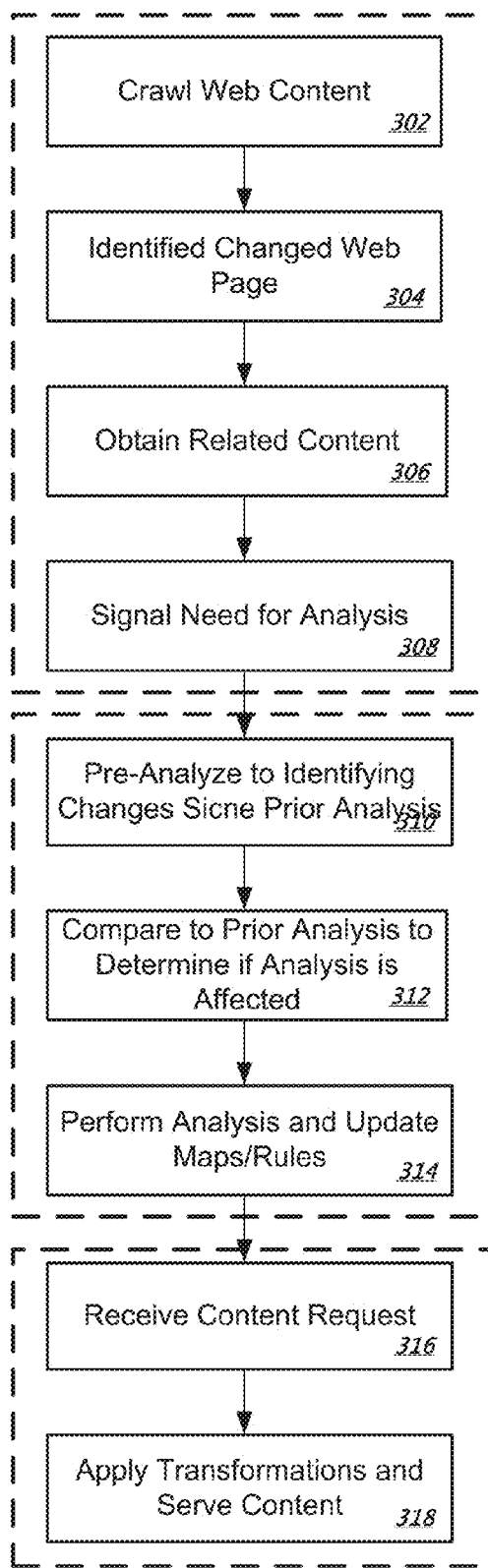
FIG. 3 is a flow chart of a process for analyzing content for transformation before the content is requested.

FIG. 3 is a flow chart of a process for analyzing content for transformation before the content is requested. In general, the process involves identifying Web content in need of potential transformation at one point in time in performing analysis to determine how the transformation is to occur, and then transforming and serving the content and in other point in time it is not connected to the first point in time. In particular, the first point in time may be before a particular request for the content is made and potentially well in advance of any request for the content.

The process begins at box 302, where the process crawls for Web content. For example, a Web crawler may perform in a typical manner across a corpus of domains or URLs that are included in a white list or other form of list or index for the Web crawler. Such domains or URLs can be identified by an organization that owns the content transformation system and Web crawler, such as an organization that operates the websites to be crawled or an organization that contracts with one or more organizations that operate various websites to be crawled. In a known manner, the Web crawler may use various techniques to determine in an efficient and effective manner what content is new or changed with in its domain of operation.

At box 302, the process identifies a change webpage. In the example just explained, the Web crawler may operate by standard mechanisms to make such a determination. In other implementations, the determination may be made upon a Web server system associated with the website reporting to a security server system that a change has been made in the Web code.

At box 306, the process obtains related content to that is changed. For example, if an HTML document for a particular webpage is determined to have changed since the last time it was analyzed, references to other documents may be identified on that HTML document, and further references in those documents may be determined, on down a hierarchical chain of documents until all documents that may be affected by war may affect the display of the webpage have been gathered. At box 308, the process signals a need for analysis.

For example, the Web crawler may communicate by way of an application programming interface with other components of a security server system to notify those other components that new content has been provided that needs analysis. If the analysis involves manual operations, the security system may further notify a manual operator and or ad a task to a queue for the manual operator so that the manual operator may immediately see that analysis may be required in advance of receiving requests for the new or modified content from users of Web browsers or other applications.

In a second phase, indicated by a second-box, analysis of the identified content occurs. For example, at box 310, pre-analysis is performed to identify changes that have occurred since any prior analysis on changed content. For example, a word by word comparison can be performed between files containing code for a webpage. Alternatively, document object models may be created for a cached version of the prior version of the webpage and a current version of the webpage. A comparison may then be made between any differences identified between the versions of the documents, and a map that has previously been generated for transformation of the content. If differences appear in any of the locations at which a map has indicated that transformation should be performed on the code, then the changes in the code may be identified as being material to the analysis, such that additional analysis is required (box 312).

At box 314, analysis is performed on the code and maps and rules for transforming the code are updated, or in the case of new content are created. The analysis may take a variety of forms, including by parsing the documents to identify particular elements such as predetermined HTML tags, and then following syntax rules to identify portions of those tags, such as names for variables and functions. Once a particular variable or function name is identified, a search may be performed throughout the remainder of the documents for other uses of that name, so that all instances of the name may be flayed with a common type of flag so that later transformations may be performed consistently across all of those instances. Various other forms of analysis and rule and map generation may also be performed.

A final box represents a third stage of the process. At box 316, for example, a request is received to deliver content from a Web server system. A security server system may act as an intermediary and intercept the request, and then forward the request in its original form or in a modified form to the Web server system area the Web server system may respond by serving the relevant pieces of code needed for generating the webpage, back to the security server system which may intercept such served code.

At box 318 the security server system applies transformations and serves the transformed content. The transformations may be performed by applying the mappings and rules to the currently served content from the Web server system. For example, the maps may be used to identify way or, in the served content, changes and modifications are to be made to the code. The rules may define, for each such location or group of locations, what transformations are to be performed. As one example, a rule may indicate a random alphanumeric string should be generated and should replace a particular function name in multiple locations or instances throughout the code base. A next time that the page is served a different random alphanumeric string may be generated, so as to provide polymorphism in such portion of the code.

In this manner, the example process provides mechanisms for frustrating attempts by illicit code to take advantage of websites, such as by implementing name in the middle attacks at the client devices of customers of website operators who employ such a security server system. The security server system may act as an intermediary and may minimize disruptions and latency in the serving of code to such customers, such as by performing relatively computationally expensive analysis operations before a corresponding request for content is received, and then simply performing transformation operations according to the prior analysis after the request is received. Certain transformation operations may also occur before a next request is received, particularly in high volume Web server applications. For example, certain function names may be changed randomly throughout code that is served before a request is received, and variable portions of the code may then be inserted after the request is received. Other portions of the analysis and transformation may also be broken out, timewise, from other common operations so as to improve the speed and accuracy of such a system.

Figure 4:
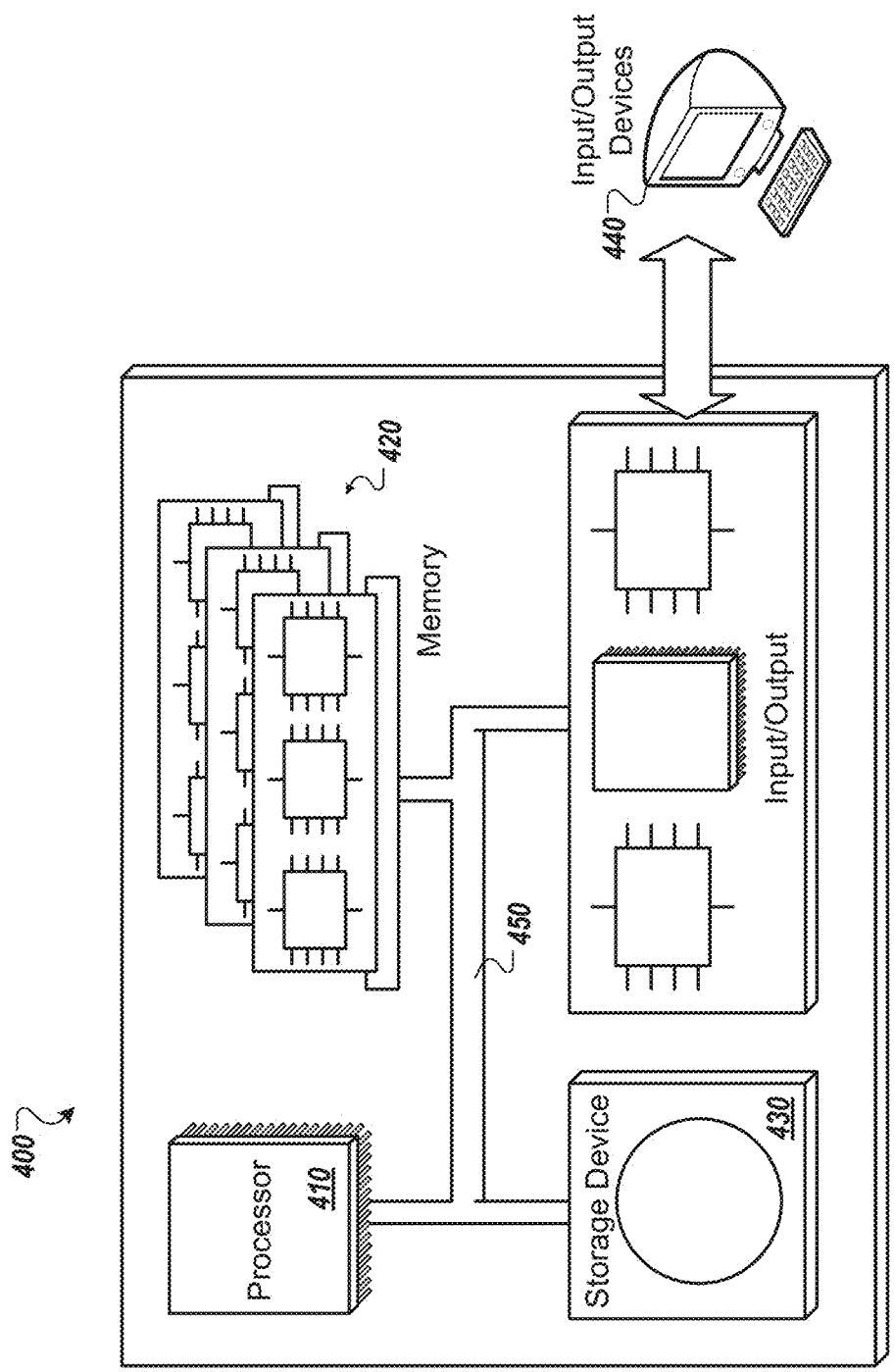
FIG. 4 is a block diagram of a generic computer system for implementing the processes and systems described herein.

FIG. 4 is a schematic diagram of a computer system 400. The system 400 can be used for the operations described in association with any of the computer-implement methods described previously, according to one implementation. The system 400 is intended to include various forms of digital computers, such as laptops, desktops, workstations, personal digital assistants, servers, blade servers, mainframes, and other appropriate computers. The system 400 can also include mobile devices, such as personal digital assistants, cellular telephones, smartphones, and other similar computing devices. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The system 400 includes a processor 410, a memory 420, a storage device 430, and an input/output device 440. Each of the components 410, 420, 430, and 440 are interconnected using a system bus 450. The processor 410 is capable of processing instructions for execution within the system 400. The processor may be designed using any of a number of architectures. For example, the processor 410 may be a CISC (Complex Instruction Set Computers) processor, a RISC (Reduced Instruction Set Computer) processor, or a MISC (Minimal Instruction Set Computer) processor.

In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 may be a floppy disk device, a hard disk device, an optical disk device, or a tape device.

The input/output device 440 provides input/output operations for the system 400. In one implementation, the input/output device 440 includes a keyboard and/or pointing device. In another implementation, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touch-screen flat-panel displays and other appropriate mechanisms.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
  identifying, by a computing system, that computer code for a set of electronic content has changed since the computing system previously analyzed the computer code to determine rules for polymorphically recoding the computer code;
  in response to identifying that the computer code for the set of electronic content has changed since the computing system previously analyzed the computer code, re-analyzing at least a portion of the computer code for the set of electronic content to determine updated rules for polymorphically recoding the computer code for the set of electronic content, wherein re-analyzing includes correlating related elements in the at least the portion of the computer code that pertain to a particular functional or visual characteristic of the set of electronic content;
  receiving a request for the set of electronic content;

applying the updated rules generated from re-analyzing the computer code for the set of electronic content to a current version of the computer code that is to be served in response to the request for the set of electronic content, including recoding the related elements in the current version of the computer code in a manner that preserves the particular functional or visual characteristic of the set of electronic content; and providing the recoded current version of the computer code for the set of electronic content to a computing device that submitted the request.

2. The computer-implemented method of claim 1, wherein re-analyzing the computer code for the set of electronic content comprises pre-processing the computer code automatically to identify elements in the computer code that are susceptible to transformation, before presenting a representation of the computer code on a terminal of the computing system.

3. The computer-implemented method of claim 1, further comprising presenting a representation of the computer code for the set of electronic content, the presenting including highlighting the related elements within the computer code in distinction to other elements in the computer code, the highlighted elements representing elements that have been automatically identified as being subject to transformation in the first code.

4. The computer-implemented method of claim 1, wherein different portions of the computer code for the set of electronic content are included in different ones of a plurality of files.

5. The computer-implemented method of claim 1, further comprising notifying, by a first sub-system of the computing system that has identified that the computer code for the set of electronic content has changed since the computing system previously analyzed the computer code, a second sub-system of the computing system about the identified change, the second sub-system configured to re-analyze the computer code in response to receiving the notification from the first sub-system.

6. The computer-implemented method of claim 1, wherein:
the set of electronic content represents a web page; and
identifying that the computer code for the set of electronic content has changed since the computing system previously analyzed the computer comprises:
generating a document object model (DOM) of the current version of the computer code;
accessing a DOM of a previous version of the computer code that was the subject of the previous analysis;
comparing the DOM of the current version of the computer code to the DOM of the previous version of the computer code; and
determining, based on the comparison, whether the current version of the computer code is materially different from the previous version of the computer code.

7. The computer-implemented method of claim 1, further comprising applying the updated rules from re-analyzing the computer code for the set of electronic content to polymorphically recode multiple instances of the computer code for different servings of the computer code responsive to various requests for the set of electronic content, wherein each of the polymorphically recoded instances of the computer code is recoded differently from each other.

8. The computer-implemented method of claim 1, wherein the request is received after re-analyzing the at least the portion of the computer code for the set of electronic content to determine the updated rules.

9. One or more tangible, non-transient devices having machine-readable media that stores instructions that, when executed by one or more processors, perform actions comprising:
identifying, by a computing system, that computer code for a set of electronic content has changed since the computing system previously analyzed the computer code to determine rules for polymorphically recoding the computer code;
in response to identifying that the computer code for the set of electronic content has changed since the computing system previously analyzed the computer code, re-analyzing at least a portion of the computer code for the set of electronic content to determine updated rules for polymorphically recoding the computer code for the set of electronic content, wherein re-analyzing includes correlating related elements in the at least the portion of the computer code that pertain to a particular functional or visual characteristic of the set of electronic content;
receiving a request for the set of electronic content;
applying the updated rules generated from re-analyzing the computer code for the set of electronic content to a current version of the computer code that is to be served in response to the request for the set of electronic content, including recoding the related elements in the current version of the computer code in a manner that preserves the particular functional or visual characteristic of the set of electronic content; and
providing the recoded current version of the computer code for the set of electronic content to a computing device that submitted the request.

10. The one or more devices of claim 9, wherein re-analyzing the computer code for the set of electronic content comprises pre-processing the computer code automatically to identify elements in the computer code that are susceptible to transformation, before presenting a representation of the computer code on a terminal of the computing system.

11. The one or more devices of claim 9, wherein the actions further comprise presenting a representation of the computer code for the set of electronic content, the presenting including highlighting the related elements within the computer code in distinction to other elements in the computer code, the highlighted elements representing elements that have been automatically identified as being subject to transformation in the first code.

12. The one or more devices of claim 9, wherein different portions of the computer code for the set of electronic content are included in different ones of a plurality of files.

13. The one or more devices of claim 9, wherein the actions further comprise notifying, by a first sub-system of the computing system that has identified that the computer code for the set of electronic content has changed since the computing system previously analyzed the computer code, a second sub-system of the computing system about the identified change, the second sub-system configured to re-analyze the computer code in response to receiving the notification from the first sub-system.

14. The one or more devices of claim 9, wherein:
the set of electronic content represents a web page; and
identifying that the computer code for the set of electronic content has changed since the computing system previously analyzed the computer comprises:
generating a document object model (DOM) of the current version of the computer code;

accessing a DOM of a previous version of the computer code that was the subject of the previous analysis;

comparing the DOM of the current version of the computer code to the DOM of the previous version of the computer code; and determining, based on the comparison, whether the current version of the computer code is materially different from the previous version of the computer code.

15. The one or more devices of claim 9, wherein the actions further comprise applying the updated rules from re-analyzing the computer code for the set of electronic content to polymorphically recode multiple instances of the computer code for different servings of the computer code responsive to various requests for the set of electronic content, wherein each of the polymorphically recoded instances of the computer code is recoded differently from each other.

16. The one or more devices of claim 9, wherein the request is received after re-analyzing the at least the portion of the computer code for the set of electronic content to determine the updated rules.

17. A computing system, comprising:

one or more computer processors;

one or more tangible devices in communication with the one or more processors and having machine-readable storage media that stores instructions that, when executed by the one or more processors, perform actions comprising:

identifying, by the computing system, that computer code for a set of electronic content has changed since the computing system previously analyzed the computer code to determine rules for polymorphically recoding the computer code;

in response to identifying that the computer code for the set of electronic content has changed since the computing system previously analyzed the computer code, re-analyzing at least a portion of the computer code for the set of electronic content to determine updated rules for polymorphically recoding the computer code for the set of electronic content, wherein re-analyzing includes correlating related elements in the at least the portion of the computer code that pertain to a particular functional or visual characteristic of the set of electronic content;

receiving a request for the set of electronic content;

applying the updated rules generated from re-analyzing the computer code for the set of electronic content to a current version of the computer code that is to be served in response to the request for the set of electronic content, including recoding the related elements in the current version of the computer code in a manner that preserves the particular functional or visual characteristic of the set of electronic content; and providing the recoded current version of the computer code for the set of electronic content to a computing device that submitted the request.

18. The system of claim 17, wherein re-analyzing the computer code for the set of electronic content comprises pre-processing the computer code automatically to identify elements in the computer code that are susceptible to transformation, before presenting a representation of the computer code on a terminal of the computing system.

19. The system of claim 17, wherein the actions further comprise presenting a representation of the computer code for the set of electronic content, the presenting including highlighting the related elements within the computer code in distinction to other elements in the computer code, the highlighted elements representing elements that have been automatically identified as being subject to transformation in the first code.

20. The system of claim 17, wherein different portions of the computer code for the set of electronic content are included in different ones of a plurality of files.

21. The system of claim 17, wherein the actions further comprise notifying, by a first sub-system of the computing system that has identified that the computer code for the set of electronic content has changed since the computing system previously analyzed the computer code, a second sub-system of the computing system about the identified change, the second sub-system configured to re-analyze the computer code in response to receiving the notification from the first sub-system.

* * * * *